United States Patent [19]

Yamanaka

[11] 4,262,859
[45] Apr. 21, 1981

[54] TRANSPORT APPARATUS WITH DIFFERENTIAL FORCE SYSTEM

[75] Inventor: Takeshi Yamanaka, Sunnyvale, Calif.

[73] Assignee: American Videonetics Corporation, Sunnyvale, Calif.

[21] Appl. No.: 49,564

[22] Filed: Jun. 18, 1979

Related U.S. Application Data

[63] Continuation of Ser. No. 849,971, Nov. 9, 1977, abandoned, and a continuation of Ser. No. 654,526, Feb. 2, 1976, abandoned.

[51] Int. Cl.³ .................. G03B 1/04; G11B 15/32
[52] U.S. Cl. ............................................... 242/192
[58] Field of Search .................. 242/192, 201–204, 242/75.43, 75.44, 75.51; 360/71, 73, 74

[56] References Cited

U.S. PATENT DOCUMENTS

| 3,370,804 | 2/1968 | Peyton | 242/192 |
| 3,592,410 | 7/1971 | Kosten et al. | 242/192 |
| 3,960,342 | 6/1976 | Furst | 242/192 |
| 4,018,402 | 4/1977 | Burdorf | 242/192 |
| 4,093,150 | 6/1978 | Burdorf | 242/192 |

Primary Examiner—Leonard D. Christian
Attorney, Agent, or Firm—Flehr, Hohbach, Test, Albritton & Herbert

[57] ABSTRACT

Tape apparatus in which a length of pliant material is fed between supply and take-up rolls in edge driven relationship with a capstan. A static force provided, for example, by friction or a spring is utilized to maintain the take-up roll against the capstan with a greater force than the supply roll, and in the event of a reversal of tape direction, this force is immediately and automatically applied to the new take-up roll and removed from the new supply roll.

18 Claims, 7 Drawing Figures

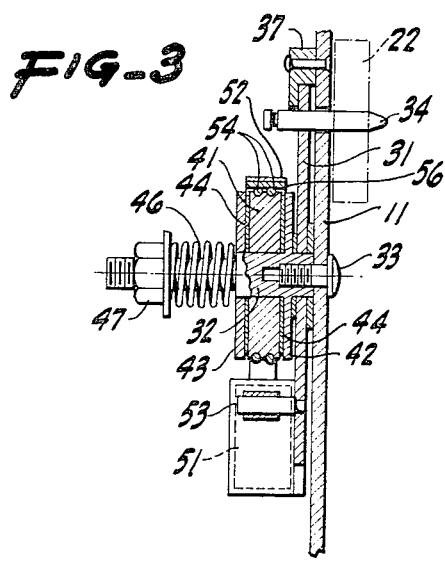
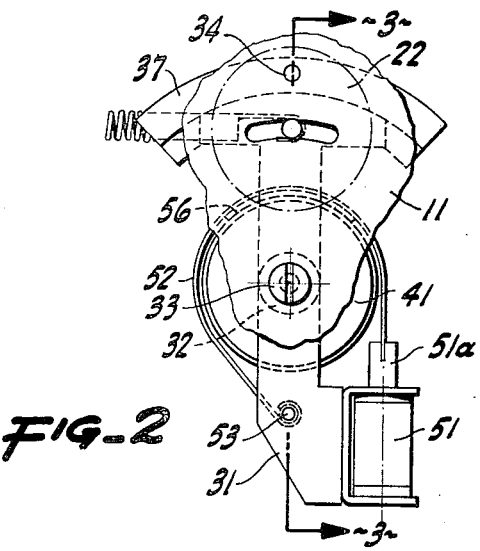
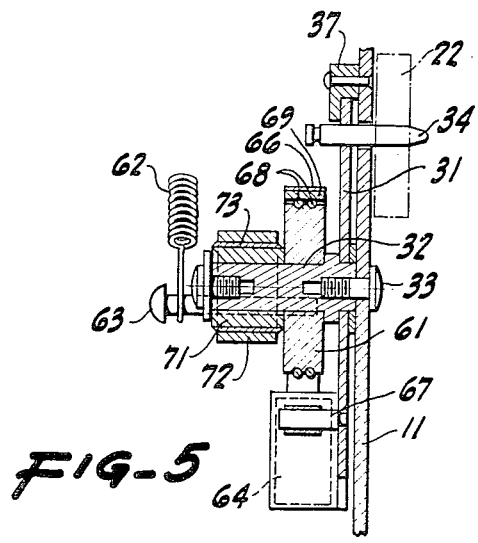
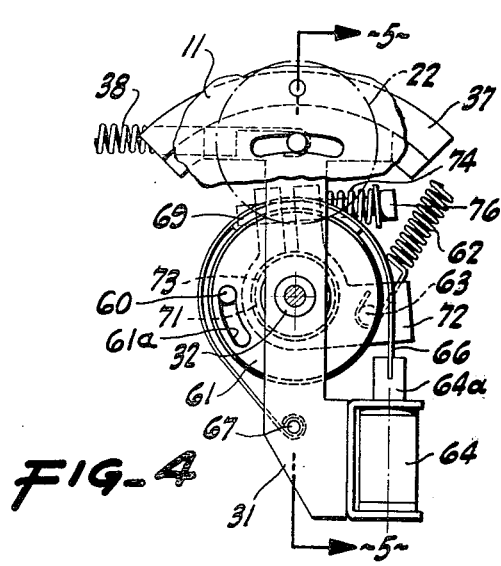
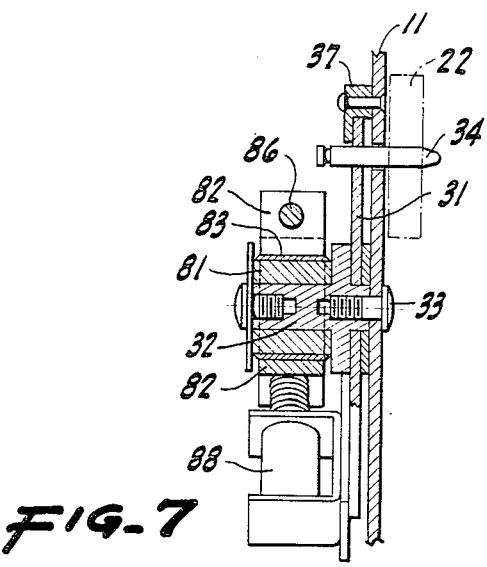
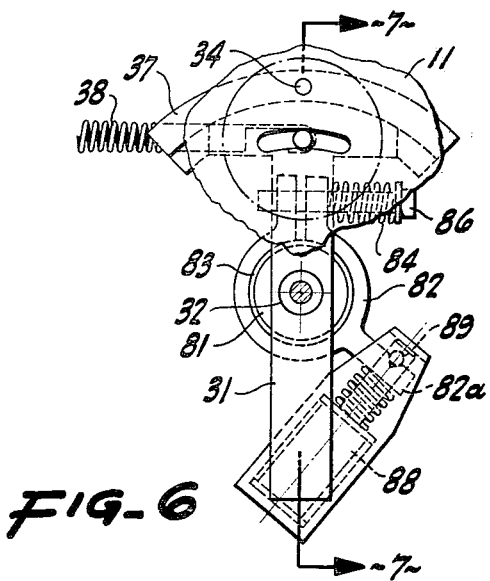

TRANSPORT APPARATUS WITH DIFFERENTIAL FORCE SYSTEM

This is a continuation of application Ser. No. 849,971 filed Nov. 9, 1977 and now abandoned and is a continuation of Ser. No. 654,526, filed Feb 2, 1976, now abandoned.

BACKGROUND OF THE INVENTION

This invention pertains generally to transport apparatus and more particularly to transport apparatus in which a length of pliant material is fed between supply and take-up rolls in edge driven relationship with a drive capstan.

In transports of the type described in U.S. Pat. Nos. 3,370,803 and 3,370,804, for example, a pliant material such as magnetic recording tape is wrapped to form supply and take-up rolls, the outer edges of which are engaged directly by a drive capstan to feed the tape between the rolls. In order to maintain control of the tape in the region between the rolls, the take-up roll must be pressed against the capstan with a greater force than the supply roll. This force differential causes the tape to pass through the interface between the take-up roll and capstan at a greater velocity than that with which it passes through the supply roll/capstan interface, thereby maintaining a slight tension in the tape and preventing the formation of undesired tape loops between the rolls.

To prevent formation of such loops, the proper forces must be established immediately when tape movement begins, and the force magnitudes must also be reversed immediately each time that the direction of tape movement is reversed. This is particularly important when the direction of tape movement is reversed repeatedly, as, for example, in the recorders utilized in digital operations, because, under these circumstances, tape control is more difficult to maintain than in the case of analog recordings where the tape is fed continuously in one direction.

Force systems heretofore provided are of two basic types—dynamic and static. In dynamic systems there is a source of power, such as a motor or other rotating component, which is utilized through various coupling means to urge the take-up roll against the capstan with a force greater than that urging the supply roll against the capstan. The '803 and '804 patents noted above disclose such systems. In the former, a string wrapped about the capstan shaft transmits power to the appropriate (take-up) carriage, and in the latter, strings wrapped bout the roll spindles draw power from these spindles as they rotate, to respectively urge the take-up roll toward the capstan and the supply away from the capstan. Also, in U.S. Pat. No. 3,408,016, it is shown how electric motors may be utilized to urge the roll carriages toward the capstan with appropriate forces.

These dynamic force systems generally meet the requirements for immediately urging the carriages against the capstan with appropriate force regardless of direction of tape motion or the rapidity with which this direction is changed. They are, however, not suitable for all requirements, in that they may be too expensive, or the power source may be inconvenient or even impossible to couple to the carriages, or, in some cases, may be insufficient for the purpose.

To overcome these objections to dynamic force systems, various static force means have been provided, as for example in U.S. Pat. Nos. 3,370,804 and 3,960,342. In such systems, no source of power is utilized to urge the take-up carriage toward the capstan, but rather, simple static forces (e.g., friction or spring) are used to yieldably resist the movement of the take-up roll away from the capstan as roll diameter increases when tape is wound thereon. In this manner a desired take-up force—even a very high one—is easily obtained, by merely increasing or decreasing friction or the strength of a spring, in order to increase or decrease the resistance to the movement of the take-up carriage away from the capstan.

Static forces in general have a serious deficiency, however, inasmuch as mere reversal of the direction of tape movement will not immediately and automatically reverse the magnitudes of the static forces acting to press the tape rolls against the capstan.

In the static friction force systems previously disclosed, such as '804, for instance, sliding friction between the carriages and the transport base is constantly present and resists movement of the carriages in either direction (toward or away from the capstan). A spring common to both carriages and of sufficient strength to overcome this frictional force is coupled between the carriages and acts to draw them toward the capstan so that the tape rolls are maintained in contact with the capstan at all times. As a result, the movement of the carriage which has been operating in the take-up mode (e.g., forced to move away from the capstan as the roll diameter increased) has been resisted by the combined forces of friction and that of the common force spring, and penetration (indentation) of the capstan tire by the take-up roll is therefore relatively great. On the other hand, penetration of the supply roll into the capstan tire is relatively little, inasmuch as it has been urged toward the capstan as its diameter decreased, by only the force of the common spring minus the resistive force of friction. In short, the required force differential is brought about only because the roll diameters change during winding and unwinding of tape, forcing the carriages to move against greater static resistive force in one direction than the other, as a result of which one roll presses against the capstan with a greater force than does the other.

The problem with such a friction force system derives principally from the fact that as long as the direction of tape movement remains unchanged, the prevailing forces will also remain unchanged, even if tape movement ceases altogether or proceeds intermittently. These circumstances would be desirable for completely unidirectional operation, but act to defeat rapid force reversals during bi-directional operation. If the forces are established for a particular direction of tape movement and remain unchanged when the tape stops in the normal course of a reversal, it will be evident that when the tape begins to move in the opposite direction, it will do so with the forces exactly opposite to what they should be: the new take-up roll will be pressing into the capstan with relatively little force, and the new supply roll will be pressing against the capstan with relatively high force. This situation will continue to a diminishing extent until enough tape has been removed from the new supply roll and wound onto the new take-up roll to force the new take-up carriage to start moving against the frictional resistance. Until this force reversal is literally complete, tape control will be compromised, and failure is likely to occur.

Static spring force systems such as described in '342 present somewhat different problems, particularly in the practical sense. In the simplest such system, a spring is attached to each of the carriages and is alternately tensioned so that the carriage acting in the take-up mode (moving away from the capstan) will always be urged toward the capstan with greater force than is the other (supply) carriage. In order to prevent the occurrence of force changes as carriage positions change, low rate springs are generally used, and because of this considerable movement of the spring anchor points will be required to tension or untension the springs. With such systems, there is no automatic reversal of the spring forces upon reversal of the direction tape movement, and factors such as the strength of the springs and the amount of movement required to tension or untension them have made it impractical to utilize electromechanical devices for reversing the forces of the springs.

SUMMARY AND OBJECTS OF THE INVENTION

This invention provides transport apparatus having a force differential system in which static forces, such as friction or a spring, are utilized to maintain the tape rolls in contact with the capstan under suitable pressure, and provides the general solution of the problem of utilizing such static force means in such a manner that the desired magnitude of force pressing each tape roll against the capstan will be immediately and automatically applied when tape movement begins, and that these force magnitudes will be immediately and automatically reversed when the direction of tape movement is reversed. Such immediate and automatic application of correct forces is essential to maintain the required tension in the tape between the tape rolls and thereby prevent loss of control of the tape, and has not been provided for in any of the static force systems previously disclosed.

It is in general an object of the invention to provide a new and improved transport apparatus having means for holding the take-up roll against the capstan with a greater force than the supply roll.

Another object of the invention is to provide transport apparatus of the above character in which the forces pressing the tape rolls against the capstan are static in nature.

Another object of the invention is to provide transport apparatus of the above character in which the static forces are provided by friction, or springs.

Another object of the invention is to provide transport apparatus of the above character in which the static forces urging the tape rolls against the capstan are applied immediately and automatically when tape movement begins, and are reversed immediately and automatically when tape movement is reversed.

Additional objects and features of the invention will be apparent from the following description in which the preferred embodiments are set forth in detail in conjunction with the accompanying drawings.

BRIEF DESCRIPTION OF THE DRAWINGS

FIG. 2 is a top plan view, partly broken away, of a portion of the transport apparatus of FIG. 1, illustrating the manner in which the take-up roll is mounted and urged toward the drive capstan.

FIG. 3 is a cross-sectional view taken along line 3—3 of FIG. 2.

FIG. 4 is a top plan view similar to FIG. 2, illustrating a second embodiment of the invention.

FIG. 5 is a cross-sectional view taken along line 5—5 of FIG. 4.

FIG. 6 is a top plan view similar to FIG. 2, illustrating the third embodiment of the invention.

FIG. 7 is a cross-sectional view taken along line 7—7 of FIG. 6.

DESCRIPTION OF THE PREFERRED EMBODIMENTS

Figure 1:
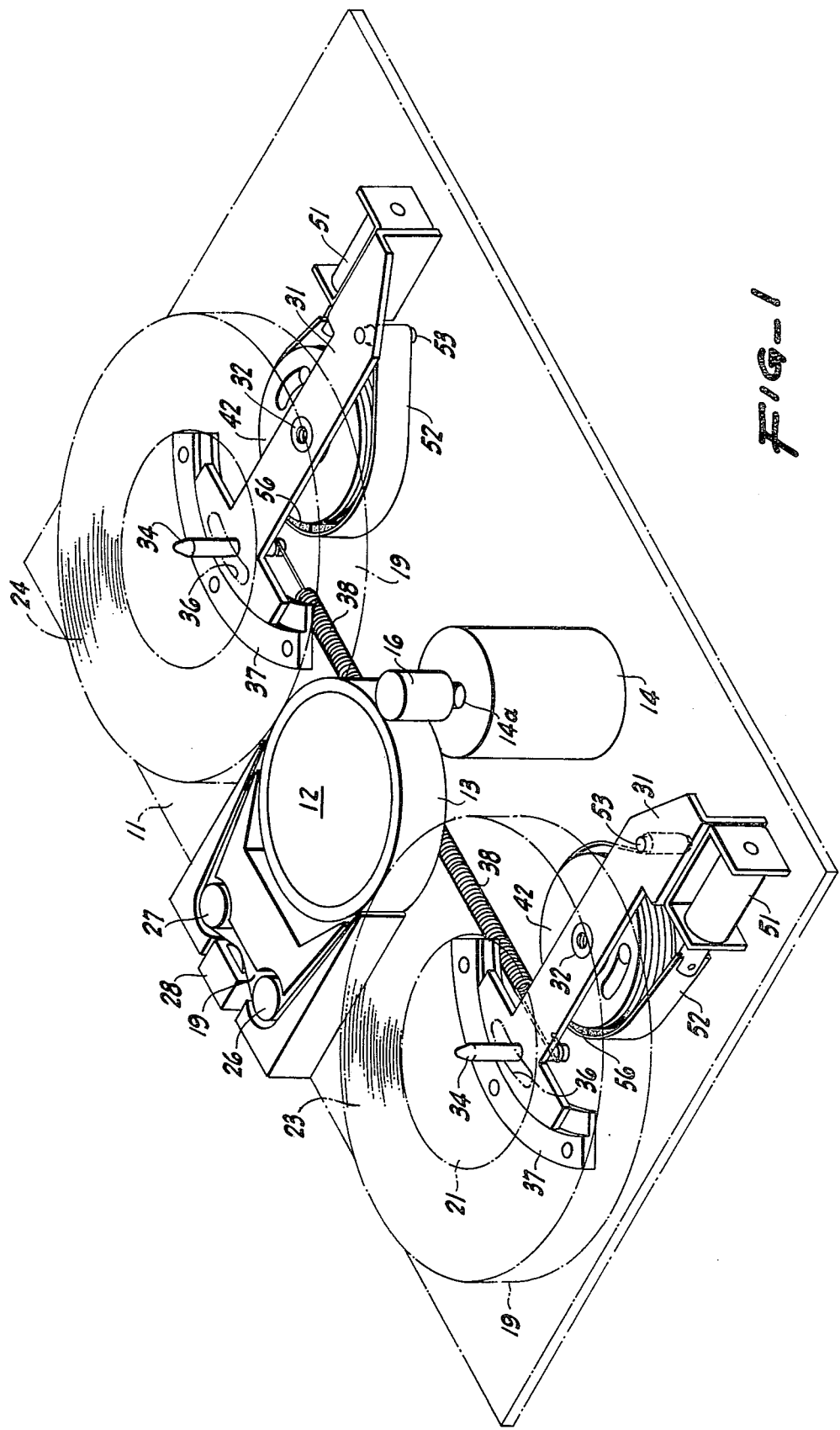
FIG. 1 is a fragmentary perspective view, partly broken away, of one embodiment of transport apparatus incorporating the invention.

The transport apparatus illustrated in FIG. 1 includes a generally planar deck or base 11 on which a drive capstan 12 is rotatively mounted. Toward its outer periphery, the drive capstan is provided with an annular tire 13 of suitable resilient material. A reversible drive motor 14 is mounted below the deck, with its output shaft 14a extending through a suitable opening (not shown) in the deck. A drive roller 16 is mounted on the output shaft and engages the outer periphery of the capstan for driving the same about its axis in either a clockwise direction or a counterclockwise direction, as viewed from above.

A length of pliant magnetic recording tape 19 is wrapped about hubs 21, 22 to form rolls 23, 24. The peripheral edges of the rolls engage the peripheral edge of capstan 12 in a driving relationship, whereby rotation of the capstan serves to feed the tape from one roll to the other, depending upon the direction of rotation. Between rolls 23 and 24, the tape is trained to form a loop about guide rollers 26, 27. A transducer head 28 engages the tape between the guide rollers for recording and playback of signals on the tape.

Rolls 23, 24 are mounted on pivot arms 31 and thereby adapted for movement toward and away from the drive capstan. The pivot arms are mounted below the deck on stationary posts 32 which are affixed to the deck by suitable means such as screws 33. Spindles 34 extend upwardly from the pivot arms and pass through arcuate slots 36 formed in the deck for receiving hubs 21, 22. Guides 37 are affixed to the underside of the deck for supporting and guiding the ends of the pivot arms on which the tape rolls are mounted. A tension spring 38 is connected between the pivot arms and yieldably urges the tape rolls against the capstan.

A force differential system is provided for increasing the force on the take-up side whenever the direction of tape movement is reversed and thereafter maintaining a greater force on the take-up side than the supply side of the capstan. Since bi-directional tape movement is contemplated, similar force system elements are mounted on both of the pivot arms, with the elements of the two arms being arranged as mirror images of each other.

The force system elements associated with hub 22 and tape roll 24 are illustrated in FIGS. 2 and 3. These elements include a clutch disk 41 which is rotatively mounted on post 32. A stationary clutch plate 42 is affixed to the post on one side of disk 41, and a pressure plate 43 is mounted on the post on the opposite side of the disk. Plate 43 is movable axially of the post and constrained against rotation. Layers of material 44 having a relatively high coefficient of friction are provided between the confronting surfaces of disk 41 and plates 42, 43. A compression spring urges the disk and plates together, and a nut 47 mounted on post 32 provides means for adjusting the force exerted by the spring.

An electrically energizable solenoid 51 is mounted on pivot arm 31, and a flexible brake band 52 is trained about the clutch disk 41. One end of the brake band is connected to a post 53 affixed to the pivot arm, and the other end of the band is connected to the plunger 51a of the solenoid. O-rings 54 are mounted in peripheral grooves on the clutch disk, and a brake pad 56 is mounted on the inner surface of band 52 for frictionally engaging the O-rings when the solenoid is energized. As discussed more fully hereinafter, the solenoid is positioned on the pivot arm in such manner that the force produced by energization of the solenoid tends to pivot the arm and urge the roll carried thereby against the capstan.

Operation and use of the transport apparatus and differential force system of FIGS. 1–3 can be described as follows. Initially, it is assumed that motor 14 is energized for driving capstan 12 in the clockwise direction, as viewed from above, which causes the tape to be fed from roll 23 to roll 24. With the tape moving in this direction, the solenoid associated with supply roll 23 is deenergized, and the solenoid associated with take-up roll 24 is energized. With the solenoid on the supply side deenergized, the pivot arm 31 which supports supply roll 23 is free to pivot about post 32, subject only to the force of spring 38. On the take-up side, the pivot arm and clutch disk 41 are locked together by brake band 52. As the diameter of the take-up roll increases, the clutch disk is forced to rotate between stationary plate 42 and pressure plate 43, producing a high force between the take-up roll and capstan.

When the direction of tape movement is reversed, the solenoid associated with roll 23 will be energized, and the solenoid associated with roll 24 will be deenergized. The initial energization of the solenoid causes arm 31 to pivot in a clockwise direction, as viewed from above, urging tape roll 23 against the capstan with increased force. This increased force causes roll 23 to penetrate into the resilient outer portion of the capstan even before the diameter of roll 23 increases sufficiently for the frictional force of the clutch to become effective. Deenergization of the solenoid associated with roll 23 produces an instantaneous decrease in the force between roll 23 and the capstan.

A second embodiment of a differential force system for use in the transport apparatus of FIG. 1 is illustrated in FIGS. 4 and 5. In this embodiment, an idler wheel 61 is rotatively mounted on post 32, and a tension spring 62 is connected between the deck and a pin 63 affixed to the wheel for urging the wheel to rotate in a counterclockwise direction, as viewed in FIG. 4. Rotation of the wheel is limited by a stationary pin 60 and a slot 61a formed in the wheel.

Means is provided for locking the idler wheel to pivot arm 31. This means includes a solenoid 64 mounted on the pivot arm and a brake band 66 trained about the idler wheel. One end of the band is connected to a pin 67 affixed to the pivot arm, and the other end of the band is connected to the solenoid plunger 64a. O-rings 62 are mounted in peripheral grooves on the idler wheel, and a brake pad 69 is mounted on band 66 for engaging the O-rings when the solenoid is energized.

Means is also provided for retarding the movement of idler wheel 61 when solenoid 64 is deenergized. This means includes a one-way clutch 71 mounted on post 32 and a brake ring 72 mounted on the clutch, with a layer of frictional material 73 interposed between the brake ring and clutch. A spring 74 and an adjusting screw 76 provide means for adjusting the pressure exerted by the brake ring on the clutch. For tape roll 24, the one-way clutch is installed for free rotation in the clockwise direction, as viewed in FIG. 4, and for roll 23 the one-way clutch is installed for free rotation in the opposite direction. Brake ring 72 is secured to idler wheel 61 by pin 63.

Operation and use of the embodiment of FIGS. 4 and 5 can now be described. Initially, it is assumed that tape is feeding from roll 23 to roll 24 and that the solenoid associated with roll 24 is energized. With the solenoid energized, pivot arm 31 is locked to idler wheel 61 by band 66, and the entire assembly comprising pivot arm 31, idler wheel 61, clutch 71, and brake ring 72 is free to rotate in the clockwise direction as the diameter of tape roll 24 increases. As the idler wheel rotates, spring 62 extends, and tape roll 24 is urged against the capstan with the force produced by this spring.

When the direction of tape movement is reversed, solenoid 64 is deenergized, and idler wheel 61 is released. However, one-way clutch 71 and brake ring 72 prevent the idler wheel from returning rapidly to its original position, the rate of return being determined by the slippage of the brake ring on the clutch. Initial energization of the solenoid on the new take-up side causes that pivot arm to pivot and move the new take-up roll toward the capstan with increased force. Thereafter, the increased force is maintained by the spring 62 on that side.

A third embodiment of a differential force system for use in the transport apparatus of FIG. 1 is illustrated in FIGS. 6 and 7. In this embodiment, a one-way clutch 81 is mounted on stationary post 32, and a brake ring 82 is mounted on the clutch, with a band of frictional material interposed between the brake ring and clutch. A spring 84 and adjustment screw 86 provide means for adjusting the pressure of the brake ring on the clutch. The clutch is oriented to permit free movement of the pivot arm toward the capstan, e.g. counterclockwise for tape roll 24, as viewed in FIG. 6, and clockwise for roll 23.

Means is included for applying an increased force between the take-up roll and capstan when the direction of tape movement is reversed. This means includes a solenoid 88 mounted on pivot arm 31, with the plunger of the solenoid being connected to a radially extending arm 82a on brake ring 82 by means of a pin 89.

Operation and use of the embodiment of FIGS. 6 and 7 can now be described. Initially, it is assumed that the tape is feeding from roll 23 to roll 24. As roll 23 decreases in diameter, the pivot arm 31 which supports that roll is drawn toward the capstan by spring 38. The one-way clutch allows the pivot arm to move freely in this direction. On the take-up side, however, the one-way clutch prevents free rotation, and as the take-up roll increases in diameter, brake ring 82 is forced to rotate on the clutch, producing a high force between the take-up roll and the capstan.

When the direction of tape movement is reversed, the solenoid on the new take-up side is energized to produce an increased force on the new take-up roll. Thereafter, the increased force is maintained by the frictional force developed in the manner described above as the diameter of the new take-up roll increases.

The invention has a number of important features and advantages. It provides an improved differential force system which is particularly suitable for use in recorders in which the direction of tape travel is reversed repeatedly. In each embodiment, a solenoid provides an additional force on the take-up roll at the instant of tape reversal, and thereafter an increased force is maintained on the take-up side by springs and/or friction.

It is apparent from the foregoing that a new and improved differential force system for transport apparatus has been provided. While only certain presently preferred embodiments have been described, as will be apparent to those familiar with the art, certain changes and modifications can be made without departing from the scope of the invention as defined by the following claims.

What is claimed is:

1. In transport apparatus for feeding a length of pliant material between supply and take-up rolls in edge driven relationship with a drive capstan: carriage means carrying the take-up roll for movement toward and away from the capstan, static force means for yieldably resisting movement of the take-up roll away from the capstan with a predetermined force, and means for automatically and instanteously coupling the force means to the take-up carriage to press the take-up roll against the capstan with the predetermined force at the outset of tape movement toward the take-up roll.

2. The transport apparatus of claim 1 wherein the means for coupling the force means comprises an electrically energizable solenoid.

3. In transport apparatus for feeding a length of pliant material between supply and take-up rolls in edge driven relationship with a drive capstan: an arm pivotally mounted on a stationary post said arm carrying the take-up roll for movement toward and away from the capstan, a clutch member rotatively mounted on the post, means frictionally engaging the clutch member for yieldably resisting rotation of said member about the post, and means for selectively locking the clutch member to the pivotally mounted arm when the take-up roll is moving away from the capstan.

4. The transport apparatus of claim 3 wherein the means for locking the clutch member to the pivotally mounted arm comprises a solenoid mounted on the arm and a brake band encircling a portion of the clutch member, one end of the brake band being affixed to the arm and the free end of said band being connected to the solenoid plunger, whereby energization of the solenoid serves to draw the band into locking engagement with the periphery of the clutch member.

5. The transport apparatus of claim 4 wherein the arm pivots in a first direction when the take-up roll moves toward the capstan and the free end of the brake band extends from the clutch member in a direction such that energization of the solenoid produces an initial movement of the solenoid and arm in the first direction.

6. In transport apparatus for feeding a length of pliant material between supply and take-up rolls in edge driven relationship with a drive capstan: a pivot arm carrying the take-up roll said pivot arm being mounted on a stationary post for pivotal movement about the post in first and second directions corresponding respectively to movement of the take-up roll toward and away from the capstan, an idler member rotatively mounted on the post, resilient means connected to the idler member for urging said member to rotate in the first direction, and means for selectively locking the idler member to the pivot arm whereby the idler member and pivot arm move as a unit and the resilient means connected to the idler member serves to urge the take-up roll toward the capstan.

7. The transport apparatus of claim 6 wherein the idler member comprises a wheel and the means for locking the idler member to the pivot arm comprises a solenoid mounted on the arm and a brake band trained about a portion of the wheel, one end of the band being affixed to the arm and the free end of the band being connected to the solenoid plunger, energization of the solenoid serving to draw the band into locking engagement with the periphery of the wheel.

8. The transport apparatus of claim 7 wherein the free end of the brake band extends from the idler wheel in a direction such that energization of the solenoid produces an initial movement of the solenoid and arm in the first direction.

9. The transport apparatus of claim 6 further including a unidirectional clutch mounted on the post for movement in the second direction, and a brake shoe affixed to the idler member and frictionally engaging the clutch for retarding movement of the idler member in the first direction.

10. In transport apparatus for feeding a length of pliant material between supply and take-up rolls in edge driven relationship with a drive capstan: a stationary post, a pivot arm carrying the take-up roll, said pivot arm being pivotally mounted on the post for movement about the post in first and second directions corresponding respectively to movement of the take-up roll toward and away from the capstan, a unidirectional clutch mounted on the post for movement in the first direction, a brake shoe frictionally engaging the clutch for yieldably resisting rotation relative thereto, and means connecting the brake shoe to the pivot arm whereby the arm is free to pivot with the brake shoe and clutch in the first direction but movement of the arm in the second direction is resisted by the brake shoe and clutch.

11. The transport apparatus of claim 10 wherein the means connecting the brake shoe to the pivot arm includes a solenoid for pivoting said arm in the first direction when energized.

12. In transport apparatus for feeding a length of pliant material between supply and take-up rolls in edge driven relationship with a drive capstan: first and second independently movable carriages carrying the supply and take-up rolls for movement toward and away from the capstan, means for urging the rolls against the capstan with a first force, static brake force means associated with each of the carriages for yieldably resisting movement of the tape rolls away from the capstan when actuated, and means for actuating the brake force means associated with the take-up roll and moving the carriage carrying the take-up roll toward the capstan at the outset of tape movement toward the take-up roll in such manner that the take-up roll is immediately urged against the capstan with force greater than the first force at the outset of tape movement toward the take-up roll.

13. The transport apparatus of claim 12 wherein the means for actuating the brake force means comprises an electrically energizable solenoid.

14. The transport apparatus of claim 12 wherein the brake force means includes unidirectional clutches which permit the rolls to move freely toward the capstan.

15. In transport apparatus for feeding in a length of pliant material between supply and take-up rolls in edge driven relationship with a drive capstan: carriage means carrying the take-up roll for movement toward and away from the capstan, means connected to the carriage means for yieldably urging the take-up roll toward the capstan with a predetermined force, static force means for resisting movement of the take-up roll away from the capstan when actuated, and means for moving the take-up roll toward the capstan and thereby instantaneously actuating the static force means at the outset of movement of the pliant material toward the take-up roll.

16. The transport apparatus of claim 15 wherein the means for moving the take-up roll toward the capstan and actuating the static force means comprises an electrically energizable solenoid.

17. The transport apparatus of claim 1 wherein the static force means comprises means for frictionally resisting movement of the take-up roll away from the capstan.

18. The transport apparatus of claim 1 wherein the static force means comprises a spring.

* * * * *